April 1, 1952 T. VAN TUYL ET AL 2,590,907
SEWING MACHINE
Filed May 23, 1947 13 Sheets-Sheet 8
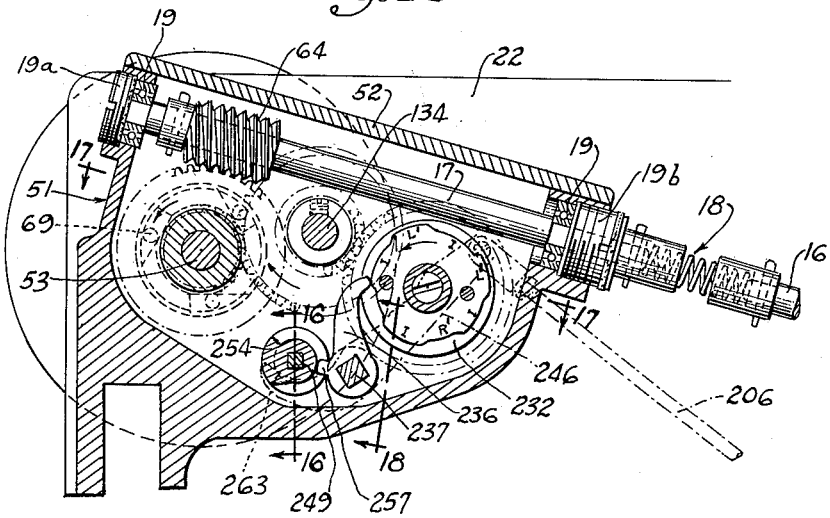
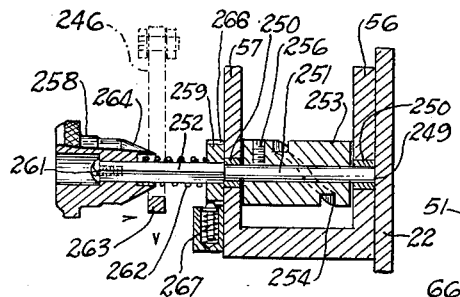
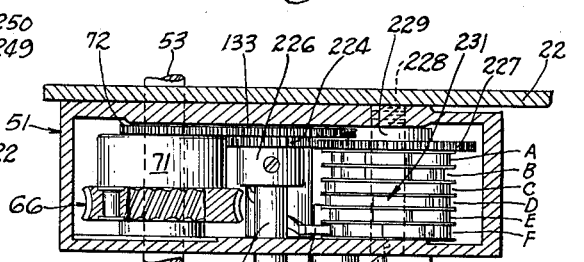
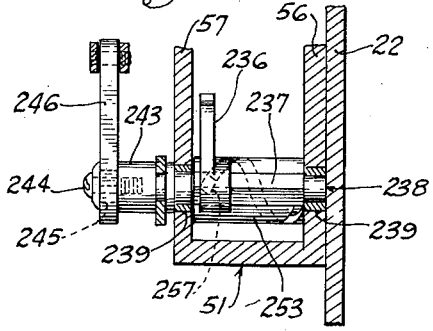
INVENTORS.
Thomas Van Tuyl
Frederick Ackermann
BY
Sheridan, Davis & Cargill
Attys

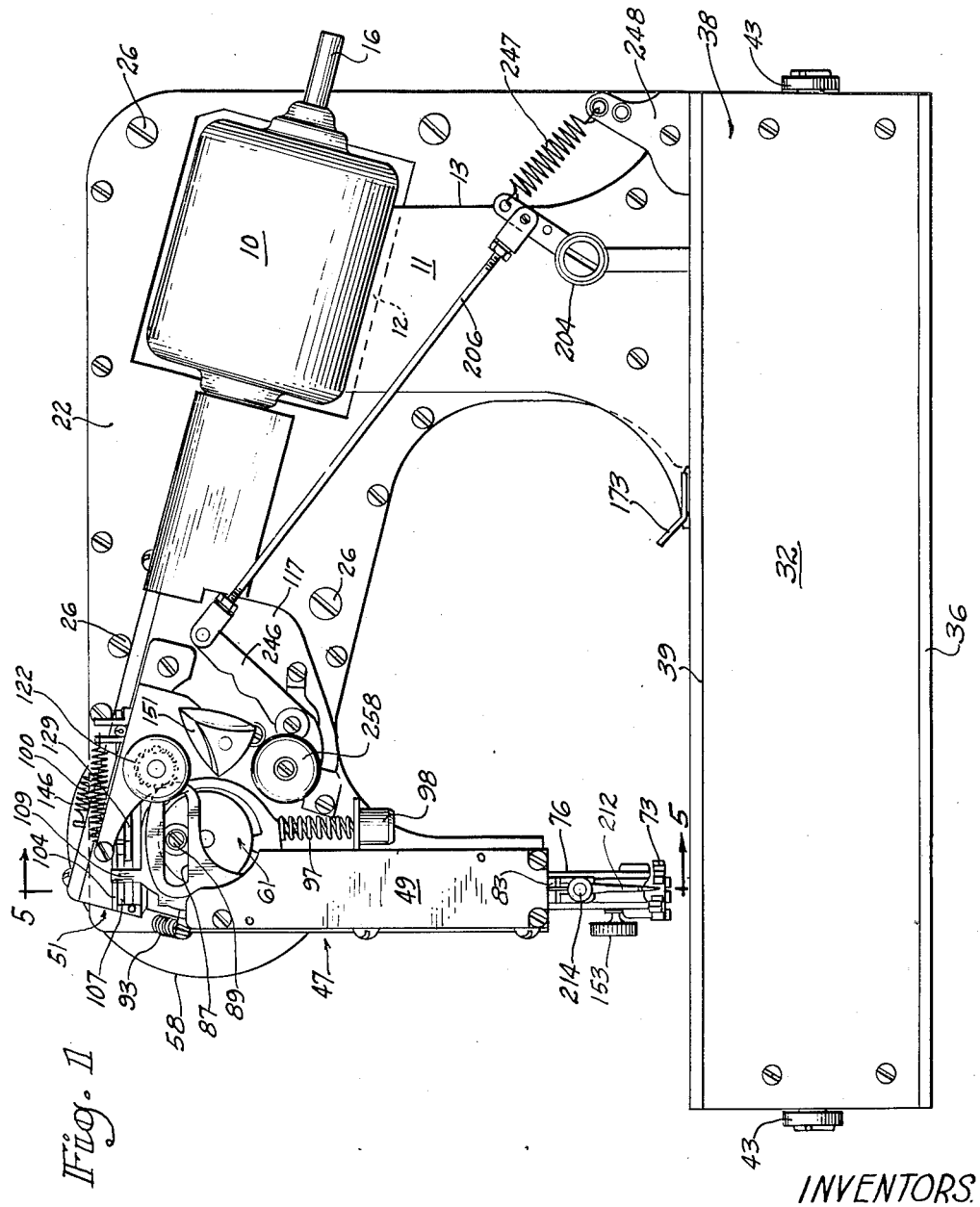

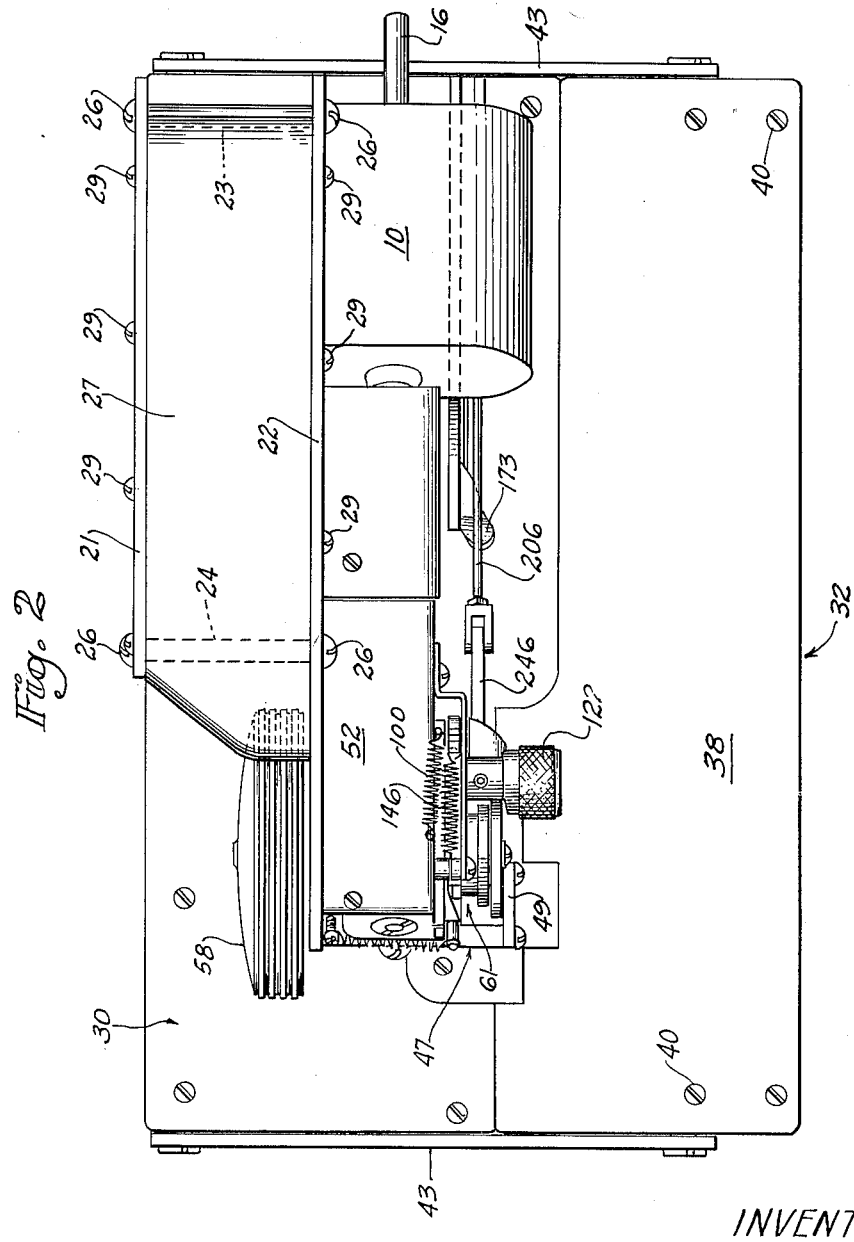

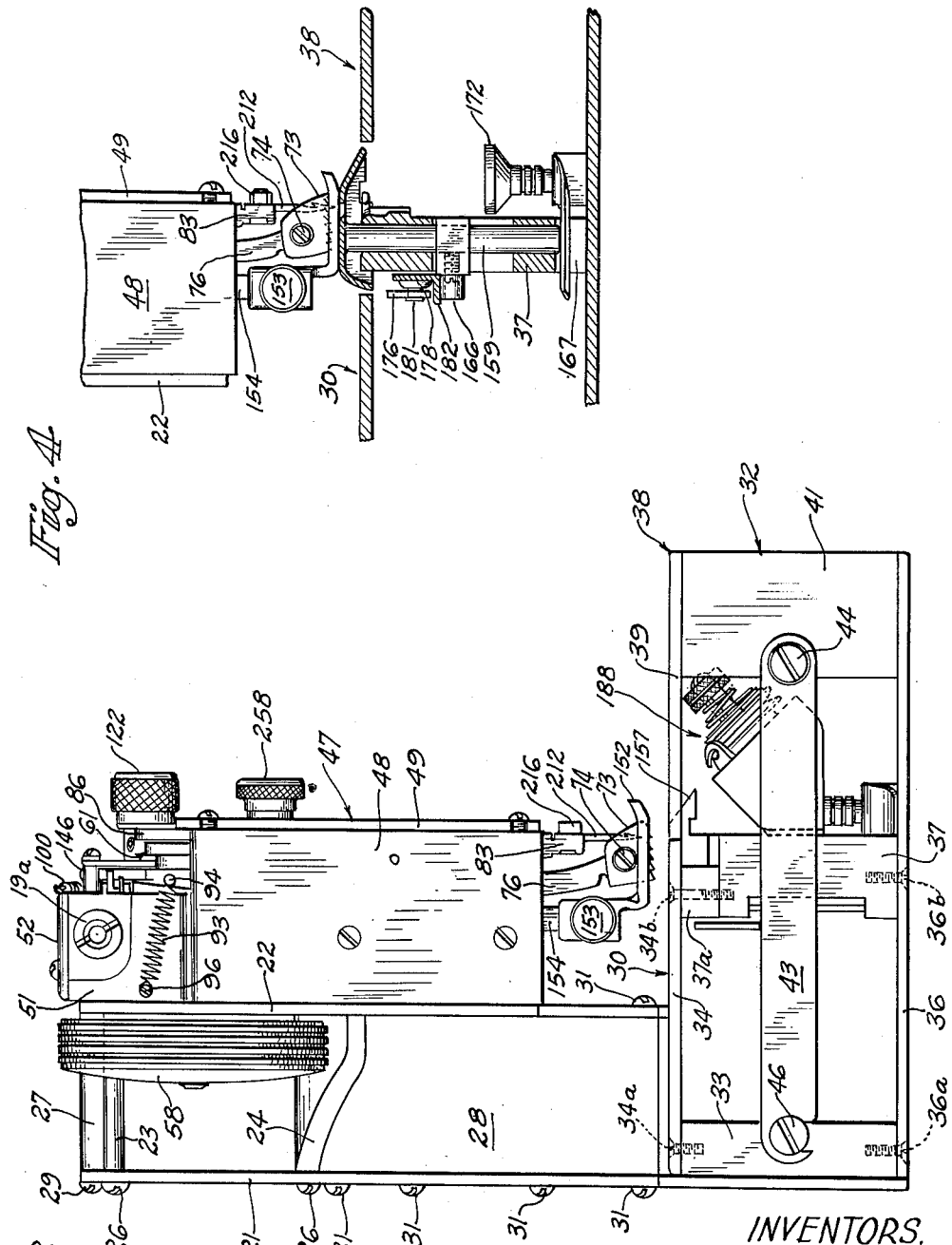

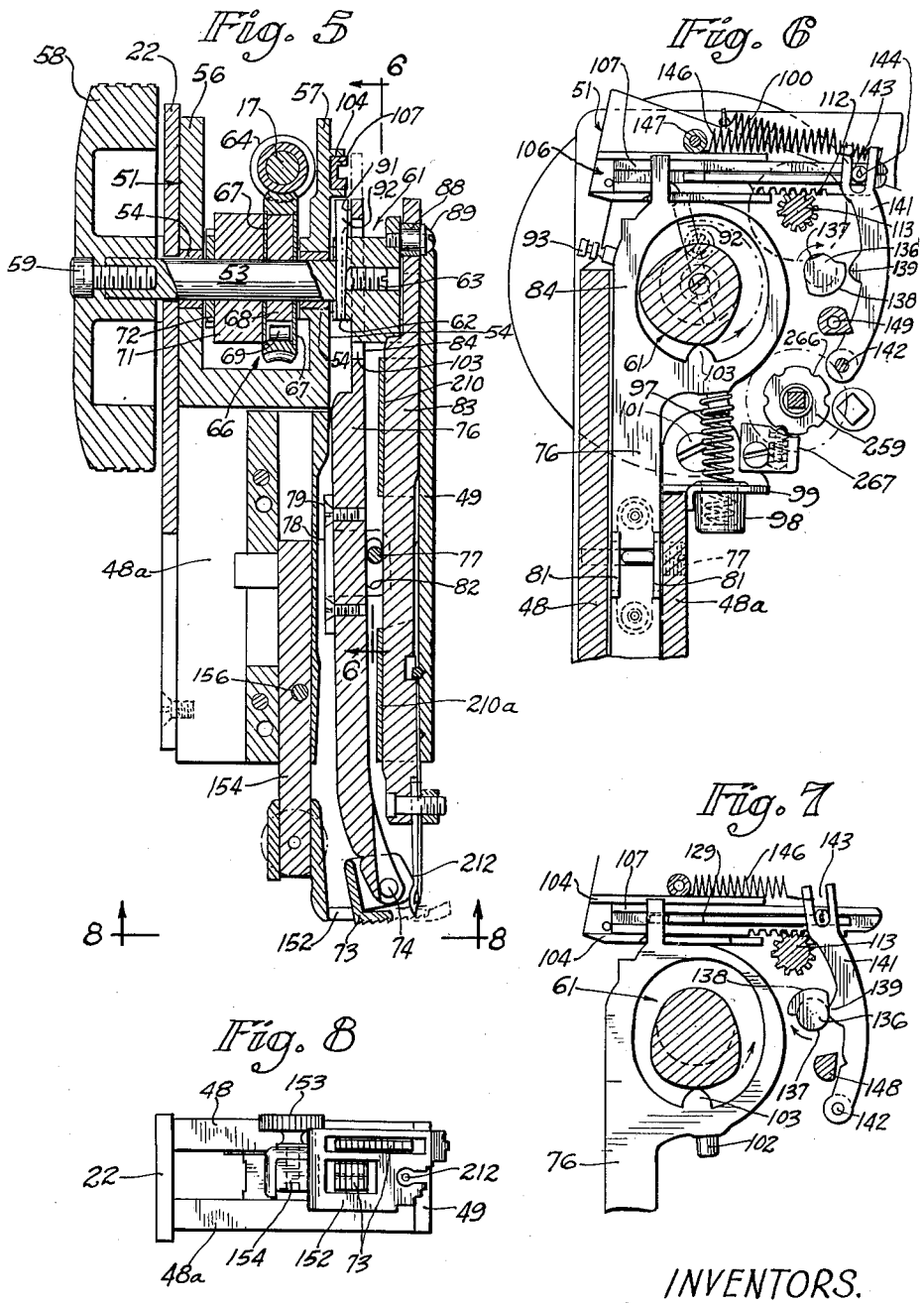

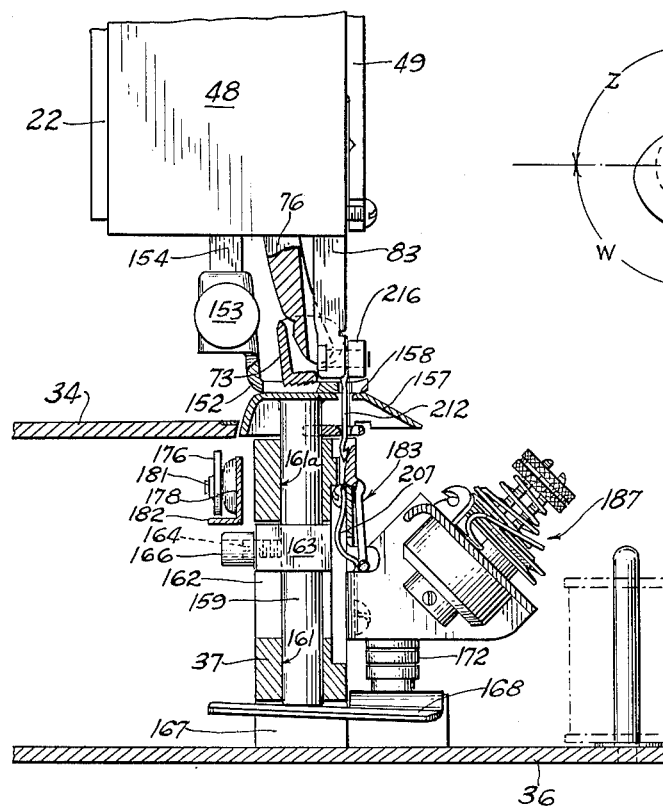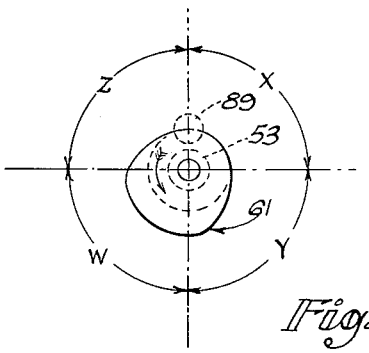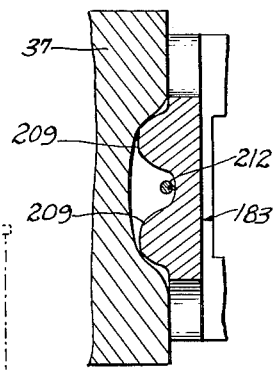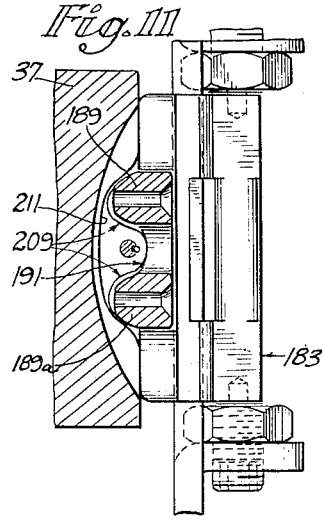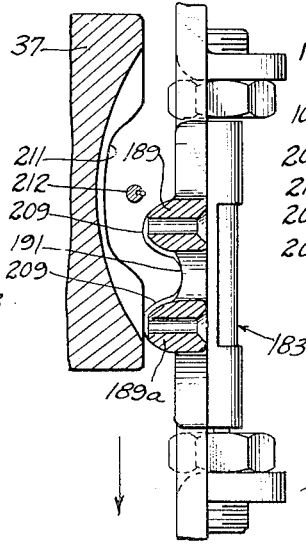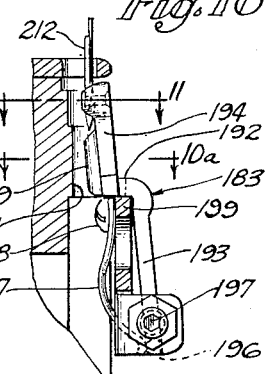

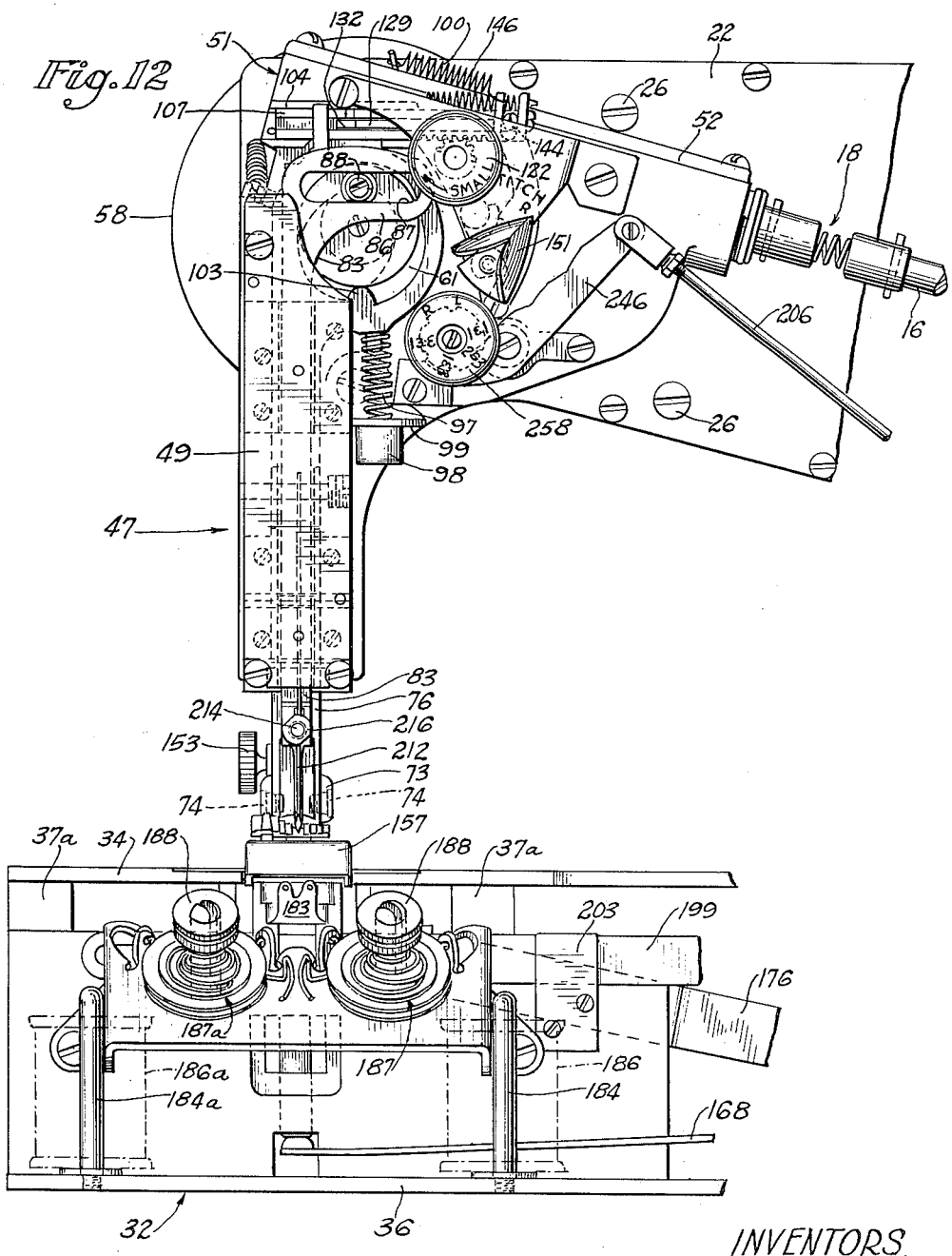

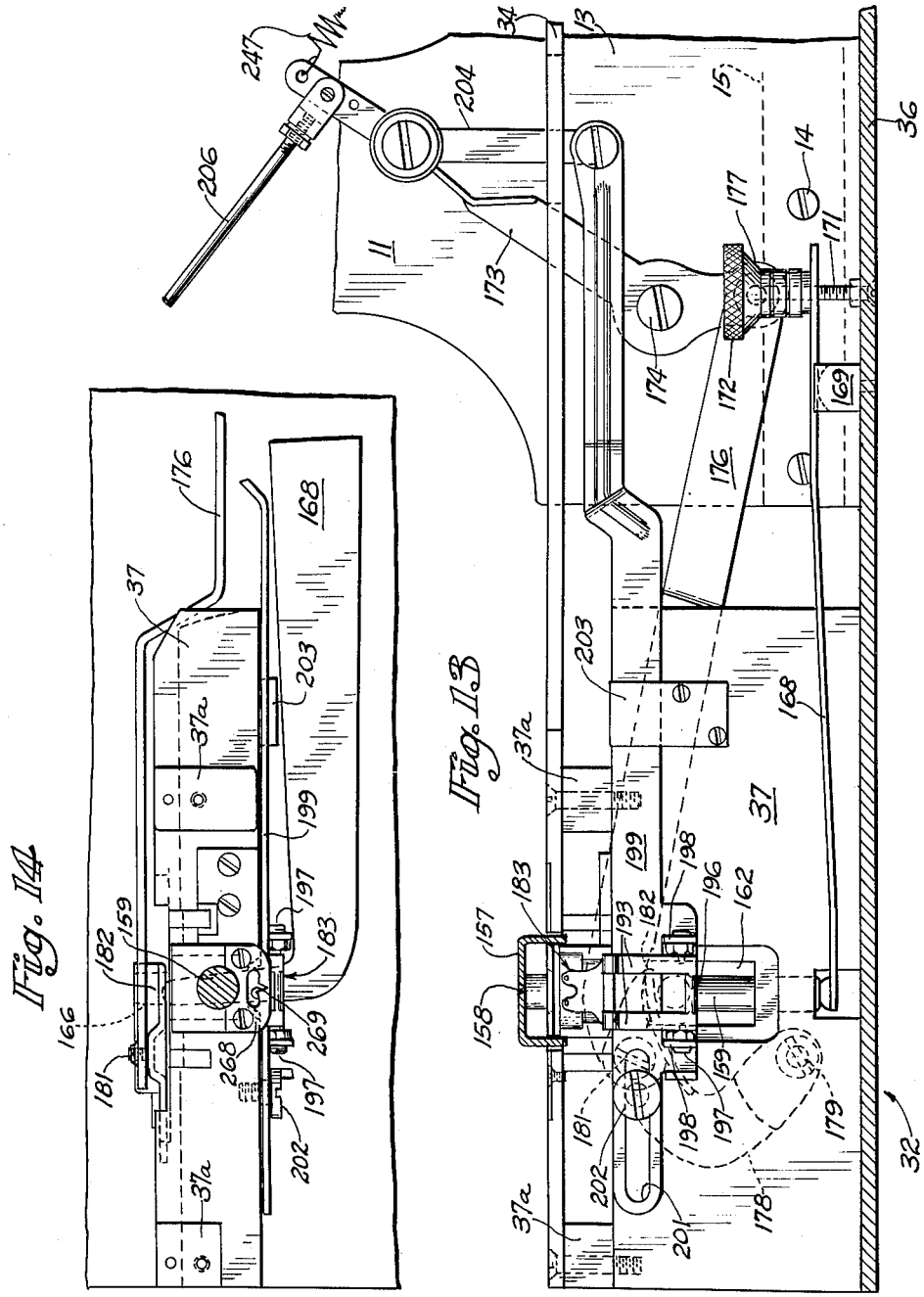

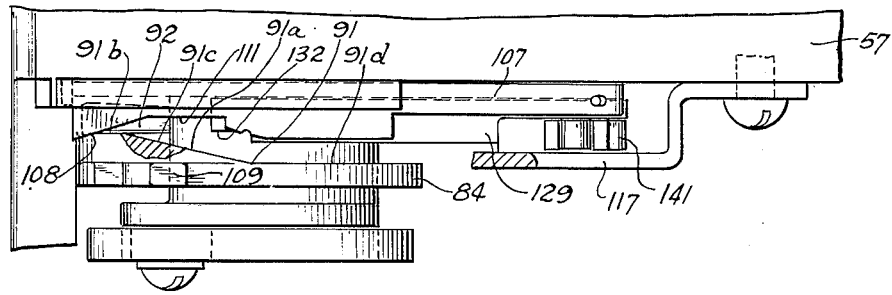
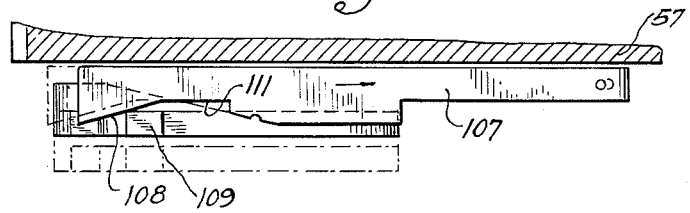
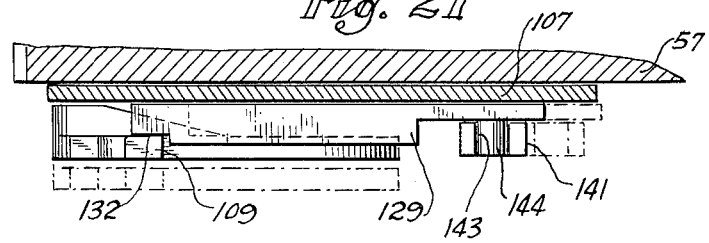
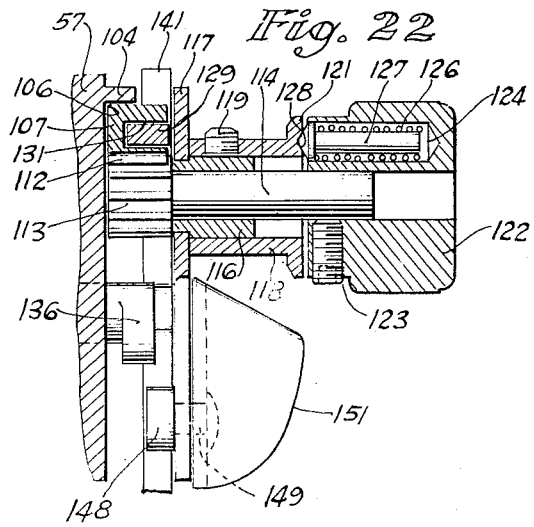

INVENTORS.
Thomas Van Tuyl
Frederick Ackermann
BY
Sheridan, Davis & Cargill
Attys

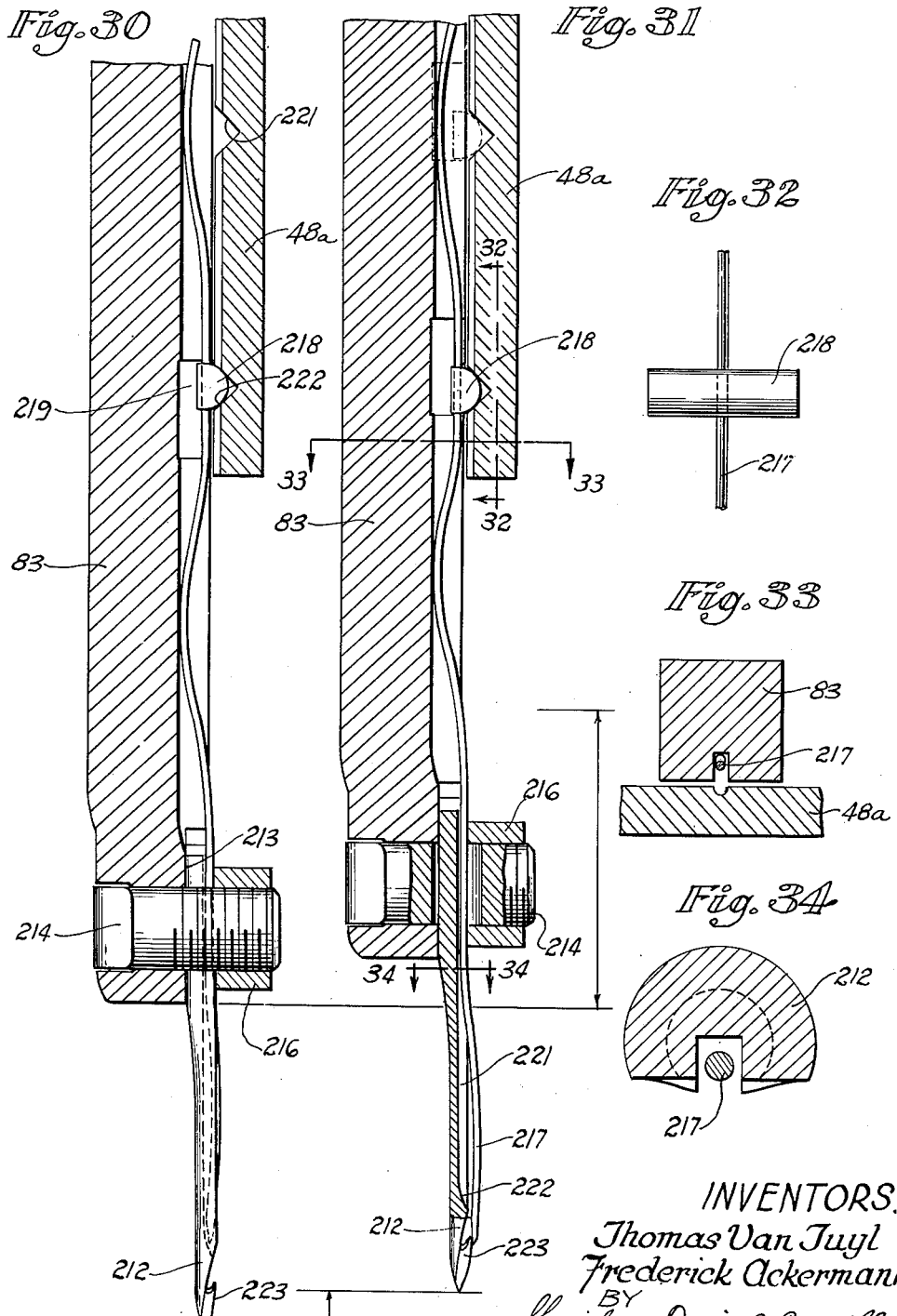

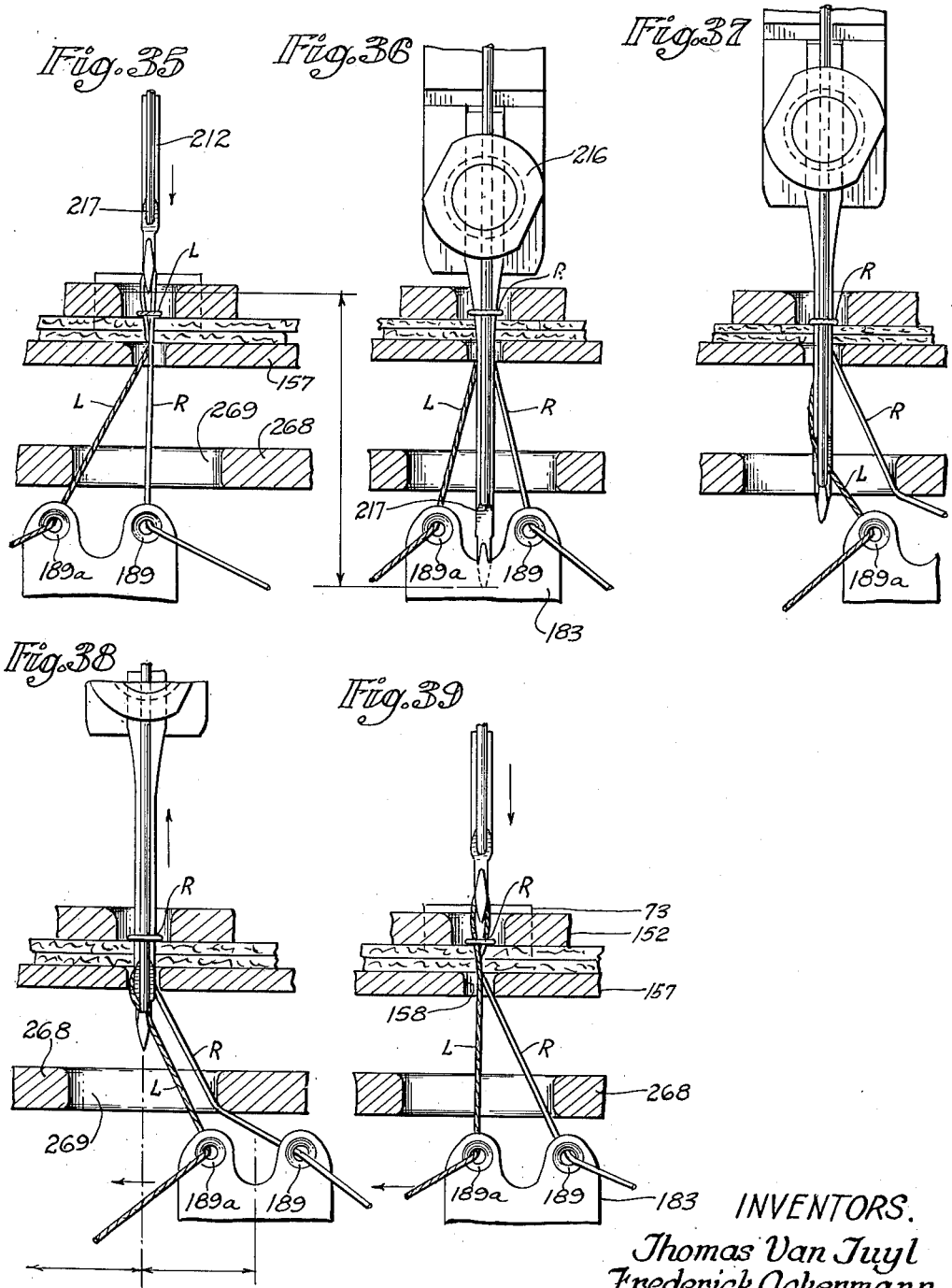

INVENTORS.
Thomas Van Tuyl
Frederick Ackermann
BY
Sheridan, Davis & Cargill
Attys Patented Apr. 1, 1952

2,590,907

UNITED STATES PATENT OFFICE 2,590,907

SEWING MACHINE

Thomas Van Tuyl and Frederick Ackermann, Chicago, Ill., assignors, by mesne assignments, to William R. Donaldson, Northport, N. Y.

Application May 23, 1947, Serial No. 749,902

31 Claims. (Cl. 112—98)

This invention relates to sewing machines.

It is an object of the present invention to provide an improved mechanism for producing chain-like stitches or stitches wherein successive loops are taken from the same thread, or from different threads in a predetermined sequence.

Another object is to provide an improved simplified mechanism by which the length of stitch is conveniently adjustable over a wide range.

Another object is the provision of mechanism by which the stitch sequence is readily variable throughout a wide range of short and long stitch combinations.

Another object is the provision of an improved sewing machine in which stitch length, stitch sequence as between long and short stitches, and the thread or threads going into the stitches are variable either separately or concurrently, even while the machine is running, to obtain improved locking and ornamental effects.

Another object is the provision of an improved work-support and presser foot combination which renders the length of loop pulled up by the needle for each stitch independent of changes in thickness of the fabric being sewed, as for instance when crossing a seam.

An important feature of the present invention is the provision of tensioning or thread hold-back means for releasably gripping each thread to pay it out in the required amount for each stitch as the loop is passed through the fabric by the needle and, subsequently, as the fabric is moved past the needle. Ancillary features include means for varying the tension on each thread for operation at different sewing conditions and to produce variable stitch combinations.

The desirability of a chain stitch sewing machine which can impart improved locking effects to the line of stitches by making certain of the stitches considerably shorter than others has long been recognized but, previous to the present invention, no one has disclosed a workable, commercially successful sewing machine capable of producing such a line of stitches by automatically varying the fabric feed independently of the needle bar action. This has been variously suggested as a desirable result by experimenters in the art, and a line of stitches illustrating this improved locking effect has even been shown in an early sewing machine patent issued near the middle of the last century, but that patent does not actually disclose a complete mechanism for sewing such a line of stitches; that disclosure is so incomplete, as in many of the early patents, that it does no more than suggest the desirability for such a machine. In this sense, therefore, the present invention fills a need which has been known to exist in the sewing art for almost a hundred years.

Previous to the below-mentioned applications and to the present invention disclosing certain improvements over said applications, no one has disclosed a workable, commercially successful, multi-thread, chain stitch sewing machine which would rapidly produce a line of interengaging loop stitches, of varying length, taken from one or more of a plurality of threads. The nearest approach to this has been disclosed in certain foreign patents in which a line of loose, purely ornamental embroidery stitches is shown, taken from different threads in recurring sequence but which are made in an entirely different manner from those of the present invention and, being purely ornamental, do not possess the improved fabric-holding characteristics of the stitches made with the machine described herein.

In certain aspects, as will appear more specifically in the following description, the present invention constitutes an improvement upon the disclosures of Thomas E. Monroe in Patents 2,152,203 issued March 28, 1939, 2,206,484 issued July 2, 1940, and 2,426,636 issued September 2, 1947; in patent applications Serial Nos. 559,579 and 559,580 (now Patents No. 2,497,231 and No. 2,497,232, respectively, issued February 14, 1950) both filed October 20, 1944; and in patent application Serial No. 474,450 filed February 2, 1943 (now Patent No. 2,497,230).

Other objects and advantages will be apparent from the following description taken in connection with the drawings in which:

Fig. 1 is an elevational view of a sewing machine embodying the invention in a preferred form and taken looking forwardly or in the direction of fabric advance;

Fig. 2 is a plan view of Fig. 1.

Fig. 3 is an end elevation of Fig. 1 as seen from the left end;

Fig. 4 is a vertical cross sectional view of a portion of the machine as shown in Fig. 3 illustrating the work-support in raised position;

Fig. 5 is a vertical cross section taken on the line 5—5 of Fig. 1;

Fig. 6 is a vertical cross section taken on the line 6—6 of Fig. 5, showing the parts in adjusted position for making a sequence of identical length stitches;

Fig. 6a is a schematic view of the cam member for imparting up and down movement to the feed foot plunger, showing the various operative surfaces thereon;

Fig. 7 is a view similar to Fig. 6 but showing the parts in the adjusted position for making a sequence of alternately long and short stitches;

Fig. 8 is a bottom view of Fig. 5 showing the lower surface of the fixed presser foot;

Fig. 9 is a fragmentary, vertical, cross section taken from the left end of the machine and approximately through the axis of the needle;

Fig. 10 is an enlarged fragmentary view of Fig. 9;

Fig. 10a is a section of Fig. 10, on the line 10a—10a;

Fig. 11 is an enlarged cross sectional view of Fig. 10 taken along the line 11—11.

Fig. 11a is a view similar to Fig. 11 showing the looping member in another operative position;

Fig. 12 is an enlarged view, looking in the direction of fabric advance of the machine, with the near half of the base removed to show one view of the thread handling and looping mechanism;

Fig. 13 is a further view of the thread handling mechanism in the base showing the parts connecting it with the driving means in the top of the machine;

Fig. 14 is a fragmentary plan view of the thread handling mechanism and the resilient work-support in the base;

Fig. 15 is a fragmentary elevational cross section of the gear box showing the relation between the various gears employed as well as the cam means for driving the thread handling and looping mechanism in the base;

Fig. 16 is a sectional view of Fig. 15 taken along the line 16—16;

Fig. 17 is a plan view of a portion of the gearing taken along the line 17—17 of Fig. 15;

Fig. 18 is a cross sectional view of Fig. 15 taken along the line 18—18 showing a portion of the cam selector means for varying the sequence of threads selected;

Fig. 19 is a fragmentary top view of the fabric foot driving and adjusting mechanism;

Fig. 20 is a view similar to Fig. 19 with certain parts cut away to show a clear top view of the rack employed for regulating the stitch length;

Fig. 21 is a view similar to Fig. 20 with a further portion cut away to show a clear top view of the reciprocable tongue which is employed in making a sequence of alternately long and short stitches;

Fig. 22 is a cross sectional view taken through the stitch length selector knob;

Figure 23:
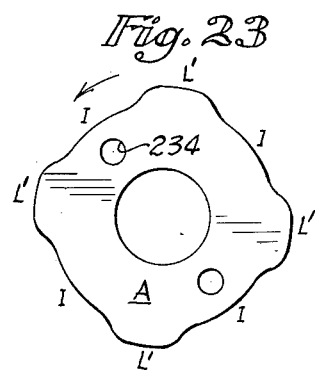
Figure 24:
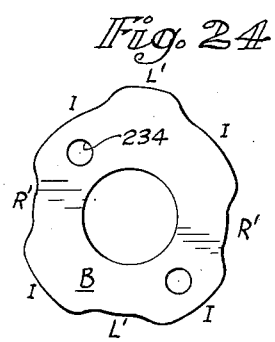
Figure 25:
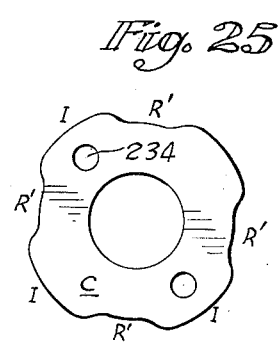
Figure 26:
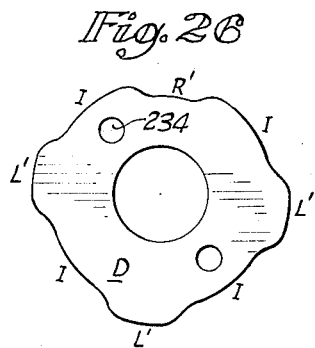
Figure 27:
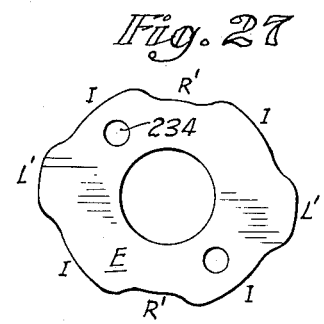
Figure 28:
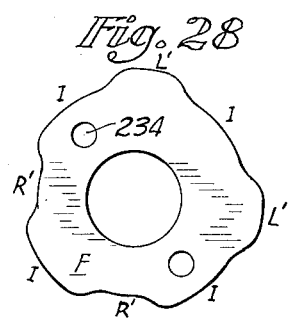
Figure 29:
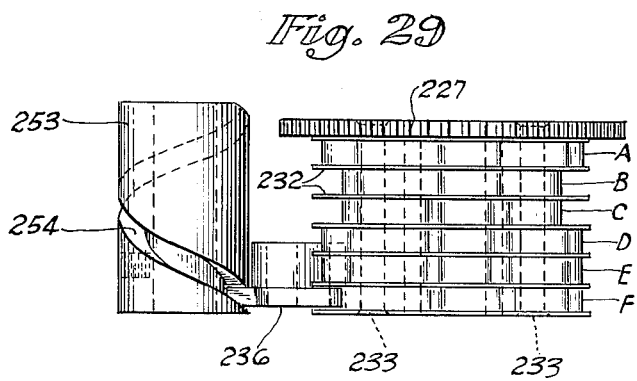
Figure 40:
Figure 41:
Figure 44:
Figure 45:
Figure 46:
Figure 47:
Figure 48:
Figure 49:
Figure 50:
Figure 40A:
Figure 41A:
Figure 44A:
Figure 45A:
Figure 46A:
Figure 47A:
Figure 48A:
Figure 49A:
Figure 50A:

Figs. 23 to 28, inclusive, are individual views of the thread selector cams employed in the present invention;

Fig. 29 is a top view of the assembled cam nest consisting of the cams shown in the previous six figures;

Fig. 30 is a greatly enlarged sectional view of the lower end of the needle bar and the needle showing the hooked needle in open position to receive a thread;

Fig. 31 is similar to Fig. 30 but shows the needle in closed position;

Fig. 32 is a side view taken on the line 32—32 of Fig. 31 showing the T-head that controls the opening and closing of the needle;

Fig. 33 is a sectional view taken along the line 33—33 of Fig. 31;

Fig. 34 is a greatly enlarged cross sectional view of Fig. 31 taken on the line 34—34 and showing the relative sizes of the needle and the internal needle pin;

Figs. 35 to 39, inclusive, are enlarged cross sectional views showing the relation of the needle, fabric, and thread handling member in a number of positions illustrating a complete operating cycle for a single stitch;

Figs. 40 and 40a (and 42 and 42a) are respectively section and plan views showing schematically a single chain stitch such as may be produced from a single thread by the machine of Fig. 1;

Figs. 41 and 41a (and 43 and 43a) are respectively section and plan views showing a double chain stitch producible by the machine in which three successive loops are taken from one thread for every one taken from the other thread;

Figs. 44 and 44a are respectively section and plan views showing a double chain stitch producible by the machine in which alternate loops are taken from alternate threads;

Figs. 45 and 45a are respectively section and plan views showing a double chain stitch in which two successive loops are taken from one thread and the next two successive loops are taken from another thread, etc.;

Figs. 46 and 46a are respectively section and plan views showing a single chain stitch in which the sequence of stitch length alternates regularly from short to long;

Figs. 47 and 47a shows a double chain stitch in which alternate loops are taken from alternate threads and in which the stitch sequence alternates regularly from short to long;

Figs. 48 and 48a illustrate a double chain stitch similar to that shown in the previous two figures except that three successive loops are taken from one thread for every loop taken from the other;

Figs. 49 and 49a illustrate a double chain stitch in which alternate loops are taken from alternate threads and in which every other loop is shortened by increasing the hold-back tension on the thread feeding the loop to be shortened (Note that the top views, as shown in Figs. 49a and 47a, appear to be identical but, as shown in the sectional views of Figs. 49 and 47, one stitch is made with a constant fabric feed and the other is made with an alternating fabric feed.); and Figs. 50 and 50a illustrate another double chain stitch which may be produced in an alternate manner—using a pair of like threads.

*Frame structure*

Referring now to Figure 1, a machine embodying one form of the present invention is illustrated as generally C-shaped. Referring also to Figs. 2 and 3, a supporting framework includes a pair of upstanding plates 21 and 22 held in parallel relation by spacer tubes 23 and 24 which are mounted by screws 26. Formed sheets 27 and 28, mounted by screws 29 and 31 respectively provide top and bottom walls to partially enclose a space between plates 21 and 22. The lower leg of the C comprises a base or housing, generally designated 32, for the thread feeding and looping mechanism. This housing 32 includes a stationary portion and a removable portion or cover, generally designated 30 and 38, respectively. The stationary portion 30 includes: a relatively heavy plate 33 secured (by means not shown) to plate 21; upper and lower plates 34 and 36 mounted on plate 33 by screws 34a and 36a; and a block 37 connected between plates 34 and 36 by screws 34b and 36b, the block 37 being spaced a distance below the upper plate by separators 37a (Fig. 12) to provide room for the operation of the thread handling mechanism, as will presently be described. The removable section 38 includes: a top plate 39, coplanar with plate 34 and providing a horizontal work table therewith; and a formed, vertical plate 41 joined by screws 40 (Fig. 2) to the plate 39. At each side of the housing is a hook member 43 pivoted on bolt 44 and engageable with the latch bolt 46 to normally hold the removable section 38 in place.

At the upper terminal of the C-shaped frame is a housing, generally designated 47, formed of plates 48, 48a and 49 suitably connected, as by screws (not shown) and mounted on the side of plate 22, enclosing the needle bar and feed foot operating mechanism. Immediately above that and to the right (Fig. 1) is a gear box 51, having a removable cover 52 and containing the gear and cam mechanisms as well as having the external control members for the feed foot and thread handling mechanisms. In the illustrated embodiment the gear box 51 is cast integrally with the side walls 48 and 48a of the housing 47.

Drive mechanism

The power source for the machine is a motor 10 mounted on a bracket member 11. This bracket member has at its top a motor platform section 12 to which the motor base is mounted by screws (not shown). As shown in Fig. 13, the vertical leg 13 of the bracket member 11 extends through the top plate 34 of the base housing and is mounted by screws 14 and angle bracket 15 to the base bottom plate 36. The motor shaft 16 (Fig. 15) is coupled to the worm shaft 17 by a coil-spring-type flexible coupling 18. Shaft 17 is journaled within ball bearings 19 held against end play by plugs 19a and 19b which are screwed into opposed ends of the gear housing.

The main drive shaft 53 (Fig. 5) is journaled within bearings 54 in the gear box walls 56 and 57 and terminates at one end with the flywheel 58 attached by bolt 59 and at the other end by a driving member 61 held in place by pin 62 and set screw 63. This shaft is driven by worm 64 through worm wheel 66. As best shown in Figs. 5 and 15 the worm wheel 66 includes side bearing plates 67 between which is carried an over-running clutch, comprising a central clutch member 68 and clutch balls or rollers 69, carried in notches formed in the periphery of the member 68, as shown. The inner surface of the rim of the worm wheel 66 forms a raceway so that, as will be understood, the worm 64 will drive the shaft 53 in one direction (counterclockwise in Fig. 15) but not in the other. By this means manual turning of the main shaft, without turning the worm 64 to back-drive the motor shaft 16, is provided for. Adjacent the worm wheel 66, a collar 71 is fitted on the main driving shaft 53 providing the proper spacing from a pinion 72 which is driven by shaft 53 and, as will be described subsequently, drives the mechanisms for automatically varying the stitch length and for varying the thread sequence in the stitch succession.

Feed foot drive

The feed foot 73 (Fig. 5) is pivotally mounted on pins 74 carried at the bottom of feed foot plunger 76, the latter in turn, being pivotally mounted on a fixed bolt or pin 77 mounted in walls 48 and 48a (Fig. 6). A bracket 78 carried on the feed foot plunger by screws 79 has a pair of transverse extensions 81 with longitudinal slots 82 for engaging the stationary pin 77 to permit combined reciprocal and pivotal movement of the plunger 76 as will next be described.

The driving member 61 operates both the feed foot plunger 76 and the needle bar 83 simultaneously. To this end the member 61 fits within the follower head or yoke 84 formed on the top of the feed foot plunger; and the needle bar 83 (Fig. 12) is formed at its upper end with a section 86 having a horizontal slot 87 within which is slidably engaged the bearing member 88 carried eccentrically on the driving member 61 by pin 89. Sidewise movement of both the feed foot plunger 76 and the needle bar 83 is restricted by the snug fit of housing walls 48 and 48a (Fig. 6).

For purpose of description herein, the direction of fabric advance will be considered the forward direction of movement; but, in referring to parts of the machine, the front will be considered that shown in Fig. 1, which is normally nearest the operator. The back side of the feed foot plunger yoke 84 is formed with a cam surface, generally designated 91, the portion taken ahead of the cross section of Fig. 5 being outlined in broken lines, also shown enlarged in solid lines in Fig. 19. Referring to Figs. 5, 6 and 19, it will be seen that counterclockwise movement (Fig. 6) of the driving pin 62 will cause the end portion 92 thereof to move the yoke 84 as follows: During the first approximately ⅛ turn, along cam surface 91a (Fig. 19), the yoke 84 will be moved backward, that is downward, as seen in Fig. 19; during the next approximately quarter-turn, the yoke will be held in this position as the driving pin moves along the flat portion 91b of the cam surface; during the next approximately ⅛ turn, as the pin moves along the descending cam surface 91c, the yoke will be moved forward (upward in Fig. 19) under the urgence of spring 93 (Fig. 3) which is carried by pins 94 and 96 fastened respectively to the yoke and the gear housing 51; and the next half turn, to complete one revolution of the pin, will be with the latter moving along the low, flat portion 91d of the yoke cam surface. In other words, since the feed foot plunger 76 is pivoted on pin 77, as above described, movement of the feed foot 73 itself will be first backward, then forward. This is only part, however, of a compound motion which also includes an up and down movement, now to be described.

As shown in Fig. 6a the rotatable driving member 61 is formed with opposed high and low surfaces constituting dwell portions W and X which occupy approximately 90° each and which are separated by feed-foot depressing and elevating portions Y and Z, each occupying about 90°. The spring 97, (Fig. 6) seated in the cup 98 of bracket 99 which is mounted on the gear box by screw 101, bears upward against the underside of the feed foot yoke 84, around the extension 102, and urges the cam follower portion 103 of the yoke upward to follow the cam surface W—Z—X—Y as the driving member 61 rotates.

It will be apparent from the above that, for each counterclockwise revolution of the main drive shaft 53 from the Fig. 6 position, the feed foot 73 will be moved through the following cycle at successive approximately quarter turns: (1) forward, that is in the fabric feeding direction; (2) upward; (3) rearward, that is opposite to the fabric feeding direction; and (4) downward.

Regulation of stitch length

The length of stitch is regulated by providing means for limiting the stroke of the feed foot to thereby limit the amount of fabric moved per stitch. In the present instance this is carried out by regulating the forward (that is to the left, Fig. 5) movement of the feed foot yoke 84 by the construction now to be described. Along the outside of the gear box 51, a pair of horizontal spaced parallel rails 104 are formed, as for instance by casting integral with the gear box and they provide therebetween a slideway 106 for the U-cross-section rack 107. The upper section of the U, as best shown in Fig. 20, is formed with an outwardly rising inclined surface 108 which the feed foot plunger extension 109 strikes to limit its forward movement under the urgence of spring 93. Thus, the position of rack 107 along the slideway 106 is determinative of the extent of stroke of the feed foot by limiting the forward movement of the extension 109. As will be apparent on examining Fig. 20, moving the rack 107 to the right shortens the stroke of the feed foot and hence the spacing between stitches; and moving it to the left lengthens the stroke to a maximum which is reached when, as in Fig. 19, the extension 109 is aligned with the flat low surface 111 on the rack. A spring 100, connected to the rack 107 and to the cover 52, urges the rack to the left to maintain it snugly pressed against the pinion 113.

As best shown in Figs. 6 and 22, the rack teeth 112 are meshed with the pinion 113 for selectively positioning the rack along its slideway. The pinion 113 is carried by shaft 114 within bushing 116 mounted on the bracket 117 which overlies the rack and pinion mechanism. A tubular collar 118 is attached to the bushing 116 by a set screw 119 and has a flanged forward end portion 121. At the end of shaft 114 is the stitch length adjusting knob 122 mounted by set screw 123. Within the recess 124 in the knob is a coiled spring 126 adapted to press the detent 127 into yieldable engagement with any one of a number of detent recesses 128 in the flange 121 to maintain the knob 122 (and hence the rack 107) in a selected position to call for a particular length of stitch.

From the foregoing it will be apparent that counterclockwise movement of the stitch length selecting knob 122 will cause a shorter stitch to be formed and vice versa.

*Sequential variation of stitch length*

Variation of certain stitch lengths in a series of stitches is effected by limiting the stroke of the fabric foot in varying amounts along the series of stitches and correlating the amount or length of thread in each stitch to the length of stroke of the fabric foot. A simple form of the invention is illustrated here, for making a series of alternately long and short stitches. In this case, the long stitch is determined by the feed foot extension 109 striking the rack 107 in any adjusted position and additional means, including the sliding tongue 129 (Fig. 21) is provided for limiting the alternate, short strokes to a value less than that. Referring to this part of the mechanism more specifically, the rack 107 is formed with a groove 131 (Fig. 22) for the slidable tongue 129. The tongue is provided with a stop surface 132 and is operable to intercept the yoke extension 109 every time a short stitch is made, this being, in the illustrated embodiment, every other forward movement of the yoke extension 109. Fig. 21 illustrates the interception of the extension in this manner for a short stitch.

Means for automatically driving the tongue 129 to intercept the extension 109 at every other stroke is shown in Figs. 6, 7, 15 and 17. A gear 133 is mounted on shaft 134 which is journaled in the walls of the gear box 51. Gear 133 is meshed with pinion 72 on the main drive shaft; their ratio is 2 to 1 so the stitch alternating shaft 134 rotates at exactly half the speed of the main driving shaft 53. The alternating shaft 134 carries at its outer end the cam member 136 which has low and high portions 137 and 138, respectively, each extending approximately halfway around the cam, the high portion engageable with the transverse extension 139 of lever 141 to maintain the latter pivoted to the right around the pin 142 as shown in Fig. 6. The lever 141 is provided with an upper, open slot 143 for pivotally engaging the transverse extension 144 of the tongue 129 to move it back and forth in the rack groove 131. Since the alternator shaft 134 rotates at just half the speed of the main driving shaft 53, when a long stitch is made, the tongue 129 will be held clear, to the right, by cam 136, as shown in Fig. 6 whereby the feed foot extension 109 will be free to move a maximum stroke all the way forward to the rack surface 111, as shown in Fig. 19, to make a long stitch, the latter being controllable as to length by moving the lower portion of rack inclined surface 108 into alignment with extension 109 as shown in Fig. 20. And when the next stitch is made, the cam 136 will permit the tongue 129 to be drawn to the left by spring 146 which is attached to the pin 147 mounted on the gear box wall; this will place the stop surface 132 of the sliding tongue in the position of Fig. 21 to limit movement of the feed foot extension to make a short stitch.

The stitch alternating tongue 129 may be used or not, as desired, by means of a hold-away cam 148 (Figs. 6, 7, and 22) connected by shaft 149 to indicating knob 151. When the hold-away cam is in the position of Fig. 6, the tongue 129 will be held to the right, as shown in Fig. 19, free of the alternator cam 136, to permit the sewing of a series of identical stitches of a length determined by the position of the rack inclined surface 108; and when in the position of Fig. 7, the tongue will be reciprocated, by alternator cam 136 and spring 146, between the Fig. 19 and Fig. 21 positions to permit the formation of a series of stitches of alternate lengths.

*Fabric foot and work support construction*

A fixed fabric foot, or presser foot 152 (Figs. 5 and 8) is held by thumb screw 153 on the bottom of the downwardly extending stationary member 154 which in turn is mounted between plates 48 and 48a by screws 156.

A resilient work-support 157 (Fig. 9) is adapted to press the fabric being sewed yieldably upward against the undersurface of the foot 132. It is an inverted, substantially cup-shaped member, apertured at 158 for the needle. The member 157 is mounted as by welding on the end of a vertical rod 159 reciprocably journaled within bores 161 and 161a in the block 37 within the base. The block 37 is cut away at 162 for a block 163 positioned on rod 159 by set-screw 164. A stud 166, carried by block 163 coacts with certain other parts to depress the work support 157 as will be described. The block 37 is also cut away at 167 for the end of the L-shaped leaf spring 168 which bears upward against the bottom of rod 159 to normally urge the work-support 157 upward toward the fixed foot. As shown in Fig. 13, the leaf spring 168 is fulcrumed atop a convex block 169 and at its end remote from the rod 159 is fastened to the base plate 36 by screw 171 and thumb nut 172 which may be turned one way or the other to adjust the upward force on the work-support lift rod 159.

Figures 9, 13 and 14 show also the mechanism employed in the illustrated embodiment of the invention for depressing the work-support (as illustrated in Fig. 3) while fabric is being inserted or readjusted beneath the needle. This depressing mechanism includes the manually operable lever 173 fulcrumed on bolt 174 mounted on plate 13; the intermediate member or link 176 pivoted to the lever 173 at 177; and the operating lever 178 fulcrumed on block 37 at 179 and pivoted to the link 176 at 181. The lever 178 has a horizontal portion 182 (Figs. 9 and 13) which extends to the right, beyond the connection 181 with the link, and counterclockwise rotation of the lever 173 from the Fig. 13 position to the Fig. 1 position will thus move the portion 182 of operating lever 178 down upon the stud 166 to lower the work-support 157 against the upward force exerted by the leaf spring 168. The lever will be held in this position due to the fact that the fulcrum point 177 is moved overcenter past a line through pivots 174 and 181.

*Thread handling and looping mechanism*

Thread is fed to the needle below the work-support 157 by a thread feeder or distributing member 183 (Fig. 10) and associated mechanism. As shown in Fig. 12, spindles 184 and 184a for a pair of spools 186 and 186a are supported on the base plate 36. The threads are passed through suitable thread guiding and tensioning means including conventional tensioning devices 187 and 187a by which the tensions on the threads are separately variable by adjusting knobs 188. From the tensioning devices the threads pass through the eyelets 189 and 189a (Fig. 11) in the distributing member to be picked up by the needle as will be described.

The distributing member 183 (Figs. 10 and 13) is formed at its upper end with a recessed surface 191 flanked by the pair of eyelet members 189 and 189a and also flanked by cam surfaces 209. It is substantially vertical except for the offset horizontal section 192. The lower portion is substantially rectangular, having the side members 193 connected by the upper portion 194 and the lower portion 196. At each side, above the bottom member 196, the distributing member is hinged to a pin 197 carried by the ears 198 struck forwardly from the reciprocable operating member 199 which is movable from side to side to cause the needle to pick a thread from either of the spools 186 or 186a as desired. One end of the member 199 is formed with a slot 201 engaging the pin 202 fastened to the supporting block 37. A bracket 203, likewise mounted on the block 37, overlies the operating member 199 and maintains it in closely guided relation with the other parts. At its opposite end, the operating member 199 is pivoted to an arm of a bell crank lever 204 mounted on plate 13, the bell crank being pivotally engaged with rod 206 which, as will be seen, is reciprocable by automatic means for selecting the different threads in a selected sequence. As will be seen in Fig. 10, a formed wire spring 207 is mounted by screw 208 on the backside of the slidable operating member 199 and its free end is effective on the bottom edge 196 of the distributing member to urge the latter in a counterclockwise direction about pivots 197. This counterclockwise movement is limited by engagement of the distributing member with the front surface of the operating member 199 also as shown in Fig. 10. Thus it will be apparent that the distributing member 183 is independently, pivotally movable with respect to the operating member 199. This provides for the backward movement of the eyelets 189 and 189a from the path of the needle, as shown in Fig. 11a to clear the needle and to press a thread against the latter as it is moved therepast by the operating member 199. Cam means, including the pair of convex surfaces 209, (Figs. 10a, 11, 11a) on the distributing member and the concave surface 211 in the block 37, is effective to back the eyelets 189—189a clear of the needle (as shown in Fig. 11a) when the operating member 199 is moved in either direction from the center position illustrated in Fig. 11.

*Needle bar and needle construction*

At this point, before proceeding further in the description of the thread handling mechanism, it is believed that it would be helpful to describe the parts of the needle bar construction not already referred to, as well as the details of the needle itself.

Referring first to Fig. 5, it will be seen that the needle bar 83 is maintained snugly guided along the front wall plate 49 by means of back guide plates 210 and 210a which are supported on the side walls 48—48a. The lower portion of the needle bar and the needle are best shown in the enlarged views of Figs. 30 and 31. The needlebar carries a hooked needle 212 in a slot 213 at its lower end, the needle being fastened therein as by means of a transversely-bored retaining bolt 214 and a locknut 216.

Cooperating with the hooked needle 212 is a needle pin 217 more fully described below having a T-head 218 which is accommodated by a cutout 219 in the needlebar. The needle pin 217 is preferably formed of spring steel or other resilient material and the portions adjacent the T-head 218 bowed as shown to bias the latter to the right (Figs. 30 and 31) to be readily engaged within the detent recesses 221 and 222 formed on the interior surface of the housing wall plate 48a adjacent the upper part of groove 213 in the needle bar. By means of this mechanism, the needle pin will be held back by the T-head 218 engaging in the upper detent 221 (see broken line view in Fig. 31) as the needle begins to descend from the uppermost limit of its travel. This permits the needle bar to move the needle 212 downward independently of the needle pin 217, as the cutout 219 is moved past the T-head, thereby causing the needle hook to be opened, as shown in Fig. 35, to eject the previously pulled up loop as it penetrates the fabric. At the bottom limit of the needle stroke, the T-head 218 will be seated within the lower detent recess 222, as shown in Fig. 30, to hold the barb open during the beginning of the upward stroke long enough for the distributing member 183 to wipe a thread into it. Subsequently, as the bottom shoulder of the cut-out 19 strikes the T-head 218, as shown in Fig. 31, the barb will be closed during the remainder of the upward stroke as a new loop is pulled through the fabric.

An important part of the present invention resides in the means for retracting the end of pin 217 on the downstroke to keep it from catching in the fabric and for moving the pin outward to cover the end of the barb and keep it from catching in the fabric when it is moved upward.

The needle groove 221 for the pin 217 is formed at its lower end with an out-turned shoulder 222 for guiding the end of the pin outward over the barb 223 in the Fig. 31 position; and, the lower end portion of the pin 217 is biased toward the interior of the groove 221 so that, as shown in Fig. 30, it will be retracted therewithin when the hook is open.

*Thread handling drive mechanism*

The mechanism for driving the thread handling mechanism for causing the distributing member 183 to present selected threads to the needle in a selected sequence is best shown in Figs. 15 to 18 inclusive and Figs. 23 to 29 inclusive. The alternator shaft 134 carries a pinion 224 held in place by collar 226. This pinion is meshed with gear 227, twice its size, that is rotatably journaled on the stationary shaft 228 supported by the gear box walls. A spacing collar 229 maintains gear 227 out in line with pinion 224. Since, as previously described, the alternator shaft 134 rotates at half the rate of the main drive shaft 53, then the gear 227 must rotate at one-fourth the rate of shaft 53. Rotatable with, and driven by gear 227 is a nest, generally designated 231, of cams which are individually designated A, B, C, D, E, and F, separated from one another by annular discs 232. The cams, as well as the separator discs are assembled as a single rotary unit with the gear 227 by means of pins 233 extending through bored holes 234 in these members.

A cam follower 236 (Figs. 15 and 18) is slidably mounted on the square portion 237 of shaft 238 which is pivotally journaled in bearings 239 in the gear box 51. The exterior end portion of the shaft 238 is carried by bracket 241 mounted by screw 242 to the front gear box wall. Spaced therefrom by the tubular member 243 and mounted by screw 244 on the square shank 245 is a lever 246. Thus, it will be apparent that the cam follower 236, the shaft 238 and the external lever 246 comprise a concurrently pivotable sub-assembly. As best shown in Fig. 1, the lever 246 is connected by rod 206 to operate the bell crank 204 which drives the thread handling mechanism in the base housing. A coil spring 247 connected to the bell crank 204 and to the bracket 248 screwed to plate 13 is effective to urge the lever 246 and, hence, the cam follower 236 in a clockwise direction to press the latter against the periphery of the particular cam desired thereby causing it to follow the contour thereof.

Means for selecting the particular cam that the member 236 is to follow is best shown in Figs. 15, 16, and 17. It will be seen that this means must operate first to lift the follower clear of the separator discs 232, and then translate the follower along the shaft 237 to the desired position. A selector shaft 249 having a circular section 251 journaled in bearings 250 in the gear box and a square section 252 extending forwardly therefrom has a member 253, with a helical groove 254, mounted thereon by set screw 256. Seated in the helical groove and slidable therein is the tail section 257 of the follower 236. It will thus be apparent that rotation of the helix member 253 will be effective to move the follower 236 along its shaft 237, providing of course that the follower is first pivoted to clear the separators 232 (by means yet to be described). On the exterior portion 252 of the selector shaft 249 is a control knob 258 and a detent disc 259, both being reciprocably but not rotatably mounted with respect to the shaft itself, the knob being held normally outward against the head of screw 261 by coil spring 262. The tail end 263 of the lever 246 is positioned to be engageable by the forward frusto-conical surface 264 of the knob 258 so that, as shown in Figs. 15, 16, and 17, forward movement of the knob 258 will thrust the lever tail 263 aside sufficiently to pivot the follower 236 counterclockwise (Fig. 15) sufficiently to clear the separators 232, whence the follower may be moved to a selected cam simply by rotating the knob 258 in one direction or the other. The detent disc 259 is formed with a series of peripheral recesses 266 which are engageable with the spring-pressed detent 267 in each position at which the follower 236 is in substantial alignment with one of the cams A—F.

Summarizing the foregoing, the cam-changing operation will be effected in the following manner. Assuming that the follower is initially in the position shown in Fig. 17, engaged with cam F, which, as will be seen, will make a series of stitches in which two stitches are selected from the left hand spool 186a and the next two from the right hand spool 186, etc. To change to cam A, which will cause all the stitches to be taken from the right hand spool, as will also be described subsequently, it is necessary only to press the selector knob 258 inward to displace the lever tail portion 263, then turn the knob clockwise until the "R" (Fig. 12) on the selector knob face is aligned with a suitable index point (not shown). An important feature of this part of the invention resides in the fact that this adjustment, as with all the other adjustments relating to the stitch length, stitch sequence, and thread selection, may readily be carried out while the machine is in operation. It will therefore be possible to progress through almost imperceptible intermediate combinations, from thread of one physical characteristic to thread of another.

Referring now to the details of the thread selecting cams themselves, shown in Figs. 23 to 28, inclusive, it will be seen that at each quadrant of each cam is a surface I of intermediate height corresponding with a central position of the thread distributing member, as illustrated in Fig. 36. Between some succeeding intermediate surfaces I are high level surfaces indicated L' (effective to cause a loop to be taken from the left thread L) and between others are low level surfaces indicated R' (effective to cause a loop to be taken from the right thread R). As will be seen by inspection of Figs. 13 and 15, the high cam surfaces L' will move the slide 199 and distributing member 183 to its right hand limit (Fig. 38) whence a loop of thread will be taken from the left hand spool; and conversely the low cam surfaces R' will permit the slide 199 and distributing member 183 to be moved by spring 247 to its left hand limit whence a loop of thread will be taken from the right hand spool. Referring now to the cams as they are shown in Figs. 23 to 28, it will be seen that the individual cams will cause thread to be taken from the right or left hand spools in the following order depending on the cam used:

Cam A—All threads from the left spool (see Figs. 40 and 40a).

Cam B—Left, right, right, right (see Figs. 41 and 41a).

Figure 42:
Figure 42A:

Cam C—All threads from the right spool (see Figs. 42 and 42a).

Figure 43:
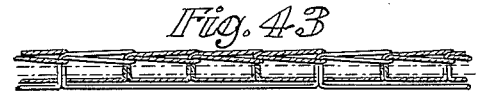
Figure 43A:

Cam D—Right, left, left, left (see Figs. 43 and 43a).

Cam E—Right, left, right, left (see Figs. 44 and 44a).

Cam F—Left, left, right, right (see Figs. 45 and 45a).

These combinations will be repeated over and over again throughout each stitch series. The above number and arrangement of cams is presented here merely for the purpose of illustration and it is believed obvious that other specific arrangements and numbers of cams may be employed in specific instances to carry out the spirit of the present invention.

*Description of a thread handling cycle*

A complete cycle for making a single stitch is shown in Figs. 35 to 39 inclusive. In explaining this cycle, consider the cam means 231 as set with follower 236 engaged with cam E so that successive stitches are made from alternate threads L and R which are taken respectively from spools 186a and 186. For clarity in the drawings, threads L and R are illustrated as black and white, respectively.

Starting in the position of Figure 5 which represents the parts in their positions when the needle bar is at the top of its stroke and the feed foot plunger is at the bottom of its stroke, the rotation of the main shaft 53 through a full revolution completes a cycle of stitching operations of the feed foot plunger 76 and needle bar 83, but pinion 224 (Fig. 17) produces only a quarter revolution of cam E so that during the stitching operation shown in Figs. 35 to 39 the follower 236 passes from a low level to a middle level and then to a high level. (Alternate stitching cycles would be just the reverse, that is from high, through intermediate, to low to take a loop from the other thread, when cam E is used as assumed.)

Assume further that, in Fig. 35, the needle is descending from its uppermost position after drawing up a loop from thread R; the needle pin 217 is beginning to open the hook so as to release the loop while piercing the fabric to make the next loop.

Fig. 36 shows the needle, with its hook fully opened at the lowermost limit of its stroke and with the distributing member 183 centrally positioned due to the follower 236 riding on an intermediate surface I of the cam at this time. The threads will be held taut by their respective tensioning devices and it will be seen that moving the distributing member quickly to the right or left while the needle is in substantially the Fig. 36 position will wrap one or the other threads around the needle and as the needle is moved upwardly the thread will be trapped in the open hook.

Fig. 37 shows a succeeding step after the distributing member is moved quickly to the right due to the follower 236 riding up onto a high level surface L'. Figure 37 also illustrates the position where the needle has risen sufficiently for the pin 217 to close the hook and trap the thread and to cover the barb as it is pulled up through the fabric.

Fig. 38 shows the needle about to draw the thread up through the fabric and also shows the right hand limit of movement of the distributing member. Furthermore, it illustrates the function of another feature of the present invention which takes the form of the plate 268 having the thread guiding aperture 269. This aperture is preferably rounded at the edges as shown to present a smooth surface to the thread passing across it. As shown in Figs. 37 to 38, it functions to limit the angle of approach of the thread to the aperture 158 of the work support; if this angle is too sharp it will cause an undue amount of friction between the thread and the work-support thereby interfering with the proper operation of the device and in some cases even causing breakage of the thread.

Fig. 39 completes the cycle of operation, showing the needle beginning to descend after drawing up a loop from thread L and showing the distributing member beginning to move leftwise due to the cam follower beginning to move down to a cam surface I of intermediate height.

In connection with the detailed description, just above, of the needle and thread handling mechanism, it is believed that at this point it would be desirable to summarize the coaction between the feed foot and the needle bar so that a clear picture may be had of the operation of all the working elements including the needle, the feed foot, and the thread handling mechanism.

It has already been observed that the cam surface on driving member 61 is divided into high and low dwell portions W and X respectively and descending and ascending surfaces Z and Y respectively, as shown in Fig. 6a; and furthermore, that each of these surfaces is effective on the feed foot plunger for approximately 90 degrees of main driveshaft rotation. And, as already stated, the division of rotary movements into quarters is not exact and need not be so, but a discussion in round figures of the relation of the feed foot and needle bar movements and omitting small angular variations will serve to simplify the same. Starting in the position of Figures 5 and 6, a complete cycle of movement may be analyzed in successive steps of one-fourth of a revolution, as set forth in the following table:

|  | Action of Feed-Foot 73 | Action of Needle-Bar 83 |
| --- | --- | --- |
| First fourth. | Moves to the left (Fig. 5) to feed fabric past the needle and draws loop out over fabric equivalent to distance between successive needle penetrations. This movement is completed just before the needle strikes the fabric. | Moves down, T-head 218 retained momentarily in recess 221, opens the needle hook to release the previously formed loop just before needle enters fabric. |
| Second fourth. | Moves up | Moves to bottom limit with needle eye still open and thread distributing member 183 in center position as shown in Fig. 36. |
| Third fourth. | Moves to the right, Fig. 5, opposite to the fabric feeding direction. | Moves up to halfway position as shown in Fig. 38, with needle eye closed on one of the threads. |
| Fourth fourth. | Moves down, returning to the Fig. 5 position. | Moves to upper limit, to the Fig. 5 position. This is substantially the same as shown enlarged in Fig. 39 except that the needle eye is closed on the newly drawn up loop. |

*Stitch combinations*

Figs. 40 to 50a, inclusive, illustrate certain of the wide variety of stitch combinations which are possible with this machine.

In Figs. 40 to 45a, the stitches are all the same length and illustrate how the succession of stitches may be varied to include different threads in different sequences depending on which of the cams A, B, C, D, E and F (Figs. 17 and 29) is utilized.

To make the stitch sequence shown in Fig. 40, in which all the stitches are taken from the same thread, and all are the same length, cam A is employed; also the hold-away cam 148 is turned to the right as shown in Fig. 6 to maintain all the stitches the same length; and the rack 107 (Fig. 6) is moved along its guideway to select the stitch length. To change from the stitch of Fig. 40 to those of Figs. 41, 42, 43, 44 and 45, it is necessary only to change the position of cam follower 236 to cams B, C, D, E and F respectively by manipulating the cam selector knob 258 as previously described.

Figs. 46 to 48a illustrate alternate long and short stitches which result from alternating the fabric feed from a short to a long stroke. This is accomplished by turning the hold-away cam 148 to the left as shown in Fig. 7 thereby permitting the tongue 129 to be reciprocated in its groove by lever 141 to intercept feed foot yoke 84 and thereby shorten the fabric feed at every other stroke. The stitch sequence shown in Fig. 46, comprising for example all white threads R, is made by setting the cam follower 236 to follow cam C thereby taking every loop from the right hand spool. The stitch sequence of Fig. 47 is made by using cam E and by turning cam 148 to the Fig. 7 position thereby causing alternate threads to be taken from both spools; and that of Fig. 48 is made by using cam B, with the alternator cam 148 in the Fig. 7 position, so that every fourth loop is taken from the left spool.

The improved locking characteristic of the varying stitch length as produced by the described mechanism will be apparent from Figs. 46, 47 and 48. In either case, when it is attempted to separate plies of fabric which have been stitched together, a short loop (white loop in Fig. 47) will be pulled through the fabric until its bend or tip is about to pass through. It is, however, impossible for this to occur without the loop being freed of the long loop which passes through it, and this long loop will lie across the fabric preventing the short loop from passing through in much the same fashion as would a pin, if passed through the short loop. This effect is, of course, not obtained with a chain stitch having loops of equal length as the loops are able progressively to free each other by successively falling back as is well known. While the best locking effect will be obtained by alternating the short and long loops, and by making the short loops as short as possible and the long loops as long as possible for a given average length of stitch, this is not essential for practicing the invention in its broader aspect, as sufficient locking effect for many applications may be obtained by using shorter and longer loops of various lengths in various sequences.

Figs. 49 to 50a illustrate stitches which have substantially the same appearance of those in Figs. 46 to 48a, from a structural standpoint. They, however, have certain advantages from a standpoint of improved locking characteristics and ornamental features which are desirable in some cases and are formed by using identical fabric feeding strokes but by applying different tensions to the tensioning and slack takeup mechanisms 187 and 187a. For example, in the illustrated machine the tension on either thread L or R may be increased relative to the other by adjusting the tensioning nuts 188. Thus, for the purpose of making a stitch sequence as shown in Fig. 49, the tension on the left-hand thread L (black) may be increased with respect to that on the right hand thread R (white). Consequently, the loop formed from the thread L, after the succeeding loop of the thread R is passed through the first mentioned loop, is then drawn back by the tension on the thread as the fabric is advanced and by the tension produced in forming the next succeeding loop from the thread L resulting in the stitch illustrated in Fig. 49 wherein the loop of the thread L is illustrated as having been shortened.

The stitch succession of Fig. 50 is further illustrative of the great degree of versatility which is possible with the machine and will be produced by using for example white threads on both spools and varying the tension thereon in the manner described in the above paragraph.

While a particular embodiment of the present invention has been shown for illustrative purposes only, it will be understood that the invention is not limited to the specific details disclosed since many modifications may be made. It is therefore contemplated by the appended claims to cover any such modifications as fall within the true spirit and scope of the invention.

We claim:

1. In a chain stitch sewing machine, and in combination, a hooked needle, means for reciprocating said needle through a fabric, thread handling mechanism cooperating therewith to form through said fabric a succession of loops and comprising means to present any of a plurality of different threads to said needle for engagement thereby at each reciprocation thereof, fabric feeding mechanism for feeding fabric past said needle at each reciprocation thereof, said fabric feeding mechanism and said reciprocable needle being so correlated in action that the needle remains substantially stationary above the fabric as the latter is fed to cause the moving fabric to draw a loop across its surface at least equal to the amount of fabric fed, means for applying a tension on each loop as it is formed, and means for separately adjusting the tensioning means for each thread to individually regulate the tension in each thread as a loop is drawn out across the fabric.

2. In a chain stitch sewing machine, and in combination, a hooked needle, means for reciprocating said needle through a fabric, thread handling mechanism cooperating with said needle for forming a loop through said fabric at each reciprocation thereof, fabric feeding mechanism for feeding said fabric past said needle at each reciprocation thereof, means for applying a tension on each loop as formed, said tension applying means being effective to pay out thread to the needle as the fabric is moved with respect to the needle, and means for varying said tension from loop to loop in a predetermined sequence.

3. In a chain stitch sewing machine, and in combination, a reciprocable needle-bar, a feed-foot having both back and forth and up and down movement, driving means for said needle-bar and feed-foot, and means for automatically limiting said back and forth movement in varying amounts in a predetermined sequence.

4. In a chain stitch sewing machine, and in combination, a reciprocable needle bar and a feed foot driven by a common driving member, the movement of said feed foot being characterized by substantially separate and distinct vertical and sidewise reciprocatory motions to effect the step-wise feeding of fabric past said needle bar, and automatic means for successively limiting said sidewise reciprocatory motion of the feed foot independent of the magnitude of the corresponding needle bar stroke for varying the lengths of fabric fed at successive reciprocations of said needle bar.

5. In a chain stitch sewing machine, and in combination, a reciprocable needle-bar, a feed-foot having both back and forth and up and down cycles of movement, and driving means for said feed foot effective to move it in one of the stated directions in each of said cycles and yieldable means urging the feed foot in the opposite of said stated directions in each of said cycles, said driving means being also effective to drive said needle bar in timed relation with the feed-foot, and means effective to vary the extent of movement in one of said cycles independent of the extent of movement in the other cycle.

6. In a chain stitch sewing machine, and in combination, a reciprocable needle bar, a feed foot carried by a feed foot bar which is both pivotable back and forth in line with the direction of movement of the fabric and reciprocable in a direction substantially normal to the fabric, means for driving said feed foot bar in timed sequence with said needle bar to effect a step-wise feeding movement of fabric under the needle bar at each reciprocation of the latter, means for limiting said pivotal movement of the feed foot bar, and means for varying the limit of pivotal movement thereof in a predetermined sequence to thereby vary the amount of fabric moved at each step past the needle bar in a predetermined sequence throughout the succession of stitches.

7. In a chain stitch sewing machine, and in combination, a reciprocable needle bar, a feed foot operable separately through forward, upward, backward and downward movements to move fabric step-wise beneath the needle bar, means for limiting back and forth movement of said foot to a short stroke, alternate means for limiting movement of said foot to a longer stroke, and stitch regulating means comprising automatic means causing each of said limiting means to be effective alternately to vary the feed foot movement between short and long strokes.

8. In a chain stitch sewing machine, and in combination, a reciprocable needle bar, carrying a hooked needle, a feed foot operable through separate up and down and back and forth reciprocable cycles to move fabric past the needle, means for limiting movement of said foot, and stitch regulating means comprising automatic means for varying the limiting means in a predetermined sequence to vary the feed foot stroke and hence the lengths of individual stitches in a predetermined sequence.

9. In a chain stitch sewing machine, and in combination, a reciprocable needle bar, a feed foot, a feed foot operating member, an eccentric drive member in operative relation to said needle bar, a drive shaft carrying said drive member, cam means movable by said shaft and effective to move said feed foot in one direction, yieldable means urging the feed foot in the opposite direction, and stitch regulating means comprising automatic means for varying the limit of movement of the foot in said opposite direction to produce a predetermined sequence of stitches of varying length.

10. In a chain stitch sewing machine, and in combination, a reciprocable needle bar, a feed foot, a feed foot operating member, a driving member for reciprocating said needle bar, cam means movable by said driving member and effective to move said feed foot in one direction, yieldable means urging the feed foot in the opposite direction, and stitch regulating means comprising automatic means for varying the limit of movement of the foot in said opposite direction to produce a predetermined sequence of stitches of varying length.

11. In a chain stitch sewing machine, and in combination, a reciprocable needle bar, a feed foot, a feed foot operating member, a rotatable drive member in operative relation to both said needle bar and feed foot operating member, a drive shaft carrying said drive member, said drive member and said feed foot operating member coacting through cam means to move the feed foot on one direction and yieldable means urging the feed foot in the opposite direction, and stitch regulating means for variably limiting the movement of said feed foot in at least one direction.

12. In a chain stitch sewing machine, and in combination, a reciprocable needle bar, a feed foot, a feed foot operating member, a rotatable drive member in operative relation to both said needle bar and feed foot operating member, a drive shaft carrying said drive member, said drive member and said feed foot operating member being in operative relation to move the feed foot in one direction and yieldable means urging the feed foot in the opposite direction, and manually adjustable stitch regulating means for variably limiting the movement of said feed foot in the opposite direction.

13. A sewing machine accordng to clam 12, in which said stitch regulating means includes a manually movable member having a stop surface inclined at an angle with respect to the axis of movement of the movable member, said stop surface being engageable with the feed foot operating member to limit the latter's movement a selected amount depending on the portion of the stop surface engaged.

14. In a chain stitch sewing machine, and in combination, a reciprocable hooked needle, thread handling mechanism cooperating therewith to form a succession of loops and comprising means to present any of a plurality of different threads to said needle for engagement thereby at each reciprocation thereof, driving means for positioning said thread handling mechanism to present a selected one of said different threads to said needle in any of a plurality of predetermined sequences, drive mechanism effective to reciprocate said needle at a constant stroke, and fabric feeding mechanism for feeding fabric past said needle at each reciprocation thereof comprising means for varying in a predetermined sequence the lengths of fabric fed throughout a series of stitches.

15. In a chain stitch sewing machine, and in combination, a reciprocable hooked needle, thread handling mechanism cooperating therewith to form a succession of loops and comprising means to present any of a plurality of different threads to said needle for engagement thereby at each reciprocation thereof, driving means for positioning said thread handling mechanism including a plurality of cams each of which is contoured to control said thread handling mechanism to present said different threads to said needle in a sequence predetermined by the contour of the cam, and means for placing a selected one of said cams in operative relation with said thread handling mechanism to present the said different threads to said needle in any of a plurality of predetermined sequences.

16. In a chain stitch sewing machine and in combination a reciprocable hooked needle, thread handling mechanism cooperating therewith to form a succession of loops and comprising means to present any of a plurality of different threads to said needle for engagement thereby at each reciprocation thereof, driving means for positioning said thread handling mechanism including a plurality of cams each of which is contoured to control said thread handling mechanism to present said different threads to said needle in a sequence predetermined by the contour of the cam, and manually operable means including a cam follower for placing a selected one of said cams in operative relation with said thread handling mechanism to present the said different threads to said needle in any of a plurality of predetermined sequences depending on the cam selected.

17. In combination in a sewing machine a thread supply source, a needle having a hook near an end thereof and a guideway extending longitudinally of said needle from said hook toward the other end of said needle, a member having an end portion adapted to overlie the barb of said hook, said member being slidably arranged in said guideway and reciprocable to and from a position at which said end portion overlies the barb of said hook and forming with said hook a closable thread receiving opening, said needle being formed with an out-turned shoulder effective to direct said end portion outward to cover said barb when said member is moved downward across said shoulder, means for moving said needle to and from operative relationship with said thread supply source, and means for operating said member to close said hook as it moves away from operative relationship with said thread supply source and to open said hook as it moves toward said thread supply source.

18. In combination in a sewing machine a thread supply source, a needle having a hook near an end thereof and a guideway extending longitudinally of said needle from said hook toward the other end of said needle, a member having an end portion adapted to cover the barb of said hook, said member being slidably arranged in said guideway and reciprocable to and from a position at which said end portion covers the barb of said hook and forming with said hook a closable thread receiving opening, means acting between the needle and said member to direct said end portion outward to cover said barb when said member is moved toward the hooked end of the needle, yieldable means for urging said end portion into the guideway when said member is moved away from the hooked end of the needle, means for moving said needle to and from operative relationship with said thread supply source, and means for operating said member to close said hook as it moves away from operative relationship with said thread supply source and to open said hook as it moves toward said thread supply source.

19. In a chain stitch sewing machine, and in combination, a movable work-support, a hooked needle reciprocable between positions above and below the work support, means for reciprocating the needle, thread handling mechanism cooperating with said needle for forming a loop at each reciprocation thereof, a fixed depending presser foot positioned above the work support, means for feeding fabric between said work support and said presser foot, and yieldable means for urging the work-support upward toward the presser foot.

20. In a chain stitch sewing machine, and in combination, a yieldable work-support engageable with the lower surface of the fabric being sewed, a fixed presser foot engageable with the upper surface of the fabric, feeding means for moving fabric between the work support and presser foot, and a reciprocable hooked needle movable between positions above and below the work support, thread handling mechanism cooperating with said needle for forming a loop at each reciprocation thereof, said position of the needle above the work support being fixed with respect to the presser foot whereby a constant loop length is pulled up above the upper surface of the fabric throughout successive reciprocations of the needle independent of local variations in fabric thickness.

21. In a chain stitch sewing machine, and in combination, a fixed presser foot having a lower surface for engaging the upper surface of the fabric being sewed, a hooked needle reciprocable between positions above and below the presser foot, at least said position above the presser foot being fixed with respect to the fabric-engaging surface of the presser foot, thread handling mechanism cooperating with said needle for drawing a loop above said fabric engaging surface of the presser foot at each reciprocation of the needle, a yieldable work-support urged upwardly toward said presser foot, means for adjusting the upward urgence of said work support, and manually operable means for depressing said work-support away from the presser foot to facilitate the insertion or removal of fabric.

22. In a sewing machine, and in combination, a reciprocable hooked needle movable through a work-support between positions above and below said work-support, fabric feeding mechanism for feeding fabric past said needle, thread handling mechanism beneath said work-support including a thread-carrying member movable toward and away from the axis of the needle and cooperating with the needle to form a loop at each reciprocation thereof, and a member interposed between the work-support and thread-carrying member effective to limit the angle of approach of the thread to the work-support with respect to said axis when the thread is drawn up through the work-support.

23. In a sewing machine, and in combination, a reciprocable hooked needle movable through a work-support between positions above and below said work-support, fabric feeding mechanism for feeding fabric past said needle, thread handling mechanism beneath said work-support cooperating with the needle to form a loop at each reciprocation thereof, and a member intermediate the thread handling mechanism and the work support, said work-support and said intermediate member having openings for passage of the needle, the opening in the intermediate member being somewhat greater than that in the work-support but effective to limit the divergence of the thread with respect to the axis of the needle as the latter draws the thread up through the work-support opening.

24. In a chain stitch sewing machine, a hooked needle, thread handling mechanism cooperating therewith and comprising a distributing member having laterally spaced thread guide portions, means for normally positioning said member in a central position with the thread guide portions on each side of and overlapping a position of alignment with the needle, and machine drive means including cam means on the distributing member for moving said member away from said needle into either of two positions on opposite sides of said needle and lying on a line spaced from said needle, so as to bring both said thread guide portions on the same side of said needle when said member is in either of the two said positions.

25. In a chain stitch sewing machine, a hooked needle, thread handling mechanism cooperating therewith and comprising a distributing member having laterally spaced thread guide portions, means for normally positioning said member in a central position with the thread guide portions on each side of and overlapping a position of alignment with the needle, said distributing member being pivotally mounted on a shaft reciprocably movable normal to the axis of said needle, means yieldably urging said member toward said needle, and machine drive means and cam means acting against the distributing member for moving said member away from said needle into either of two positions on opposite sides of said needle and lying on a line spaced from said needle, so as to bring both said thread guide portions on the same side of said needle when said member is in either of the two said positions.

26. In a chain stitch sewing machine, and in combination, a reciprocable needle, thread handling mechanism cooperating therewith to form a succession of loops and comprising means to present any of a plurality of different threads to said needle for engagement thereby at each reciprocation thereof, driving means for positioning said thread handling mechanism including a plurality of cams each of which is contoured to control said thread handling mechanism to present said different threads to said needle in a sequence predetermined by the contour of the cam, and means including follower means selectively engageable with any one of said cams for placing a selected one of said cams in operative relation with said thread handling mechanism to present the said different threads to said needle in any of a plurality of predetermined sequences.

27. In a chain stitch sewing machine, and in combination, a hooked needle, a fabric-supporting surface, a rotatable driving member effective to reciprocate said needle above and below said fabric-supporting surface, thread handling mechanism cooperating with said needle for forming a loop at each reciprocation thereof, fabric feeding mechnism for feeding fabric past said needle at each reciprocation thereof and including a feeder foot, the action of the feeding mechanism and needle driving member being so correlated that the feed foot is effective to feed fabric past the needle during the interval when said driving member is within substantially ⅛ revolution of its position corresponding to the top end of the needle stroke, and tensioning means associated with the thread handling mechanism effective to tension the thread held by the needle as the fabric is fed past it, said tensioning means also being effective to pay thread out over the fabric for each stitch responsive to the relative movement of the fabric past the needle for that stitch.

28. In a chain stitch sewing machine, and in combination, a hooked needle, a work-supporting member, a presser foot positioned above said work-supporting member and having a downwardly-facing fabric engaging surface, a rotatable driving member operably connected to said needle to impart to same a reciprocatory stroke ending above and below said work-supporting member, thread handling mechanism cooperating with said needle for forming a loop at each reciprocation thereof, fabric feeding mechanism for feeding fabric past said needle at each reciprocation thereof, the needle being so positioned relative to the presser foot that the point of the needle is beneath the fabric-engaging surface of the presser foot during the interval when said rotatable driving member is within substantially ⅞ revolution of its position corresponding to the bottom end of the stroke, and tensioning means associated with the thread handling mechanism effective to tension the thread held by the needle as the fabric is fed past it, said tensioning means also being effective to pay thread out over the fabric for each stitch responsive to the relative movement of the fabric past the needle for that stitch.

29. In a chain stitch sewing machine, and in combination, a reciprocable needle, a feed-foot which is both movable back and forth in line with the direction of movement of the fabric and movable up and down in a direction substantially normal to the fabric, means for driving said feed foot in timed sequence with said needle to effect a step-wise feeding movement of fabric past the needle at each reciprocation of the latter, means for limiting said back and forth movement of said feed-foot, and means for varying the limit of said back and forth movement in a predetermined sequence to thereby vary the amount of fabric moved at each step past the needle in a predetermined sequence throughout the succession of stitches.

30. In a chain stitch sewing machine, and in combination, a reciprocable needle, a feed foot operable through back and forth and up and down movements to move fabric step-wise beneath the needle, means for limiting back and forth movement of said foot to a short stroke, means for limiting movement of said foot to a long stroke, and stitch regulating means comprising automatic means causing each of said limiting means to be effective in a predetermined sequence to vary the feed foot movement in a predetermined sequence between short and long strokes.

31. In a chain stitch sewing machine, and in combination, a reciprocable needle, a feed foot operable through back and forth and up and down movements to move fabric step-wise beneath the needle, means for limiting back and forth movement of said foot to a long stroke, means for shorting said stroke, and stitch regulating means comprising automatic means for rendering said stroke-shortening means effective in a predetermined sequence to vary the back and forth movement of the feed foot in a predetermined sequence between short and long strokes.

THOMAS VAN TUYL.
FREDERICK ACKERMANN.

REFERENCES CITED

The following references are of record in the file of this patent:

UNITED STATES PATENTS

| Number | Name | Date |
|---|---|---|
| 29,268 | Hicks | July 24, 1860 |
| 216,791 | Grover | June 24, 1879 |
| 2,042,590 | Chiti | June 2, 1936 |
| 2,152,203 | Monroe | Mar. 28, 1939 |
| 2,206,484 | Monroe | July 2, 1940 |
| 2,426,636 | Monroe | Sept. 2, 1947 |